Jan. 29, 1946.  J. D. BUCHANAN  2,393,747
EXPANSIBLE PISTON
Filed April 21, 1945
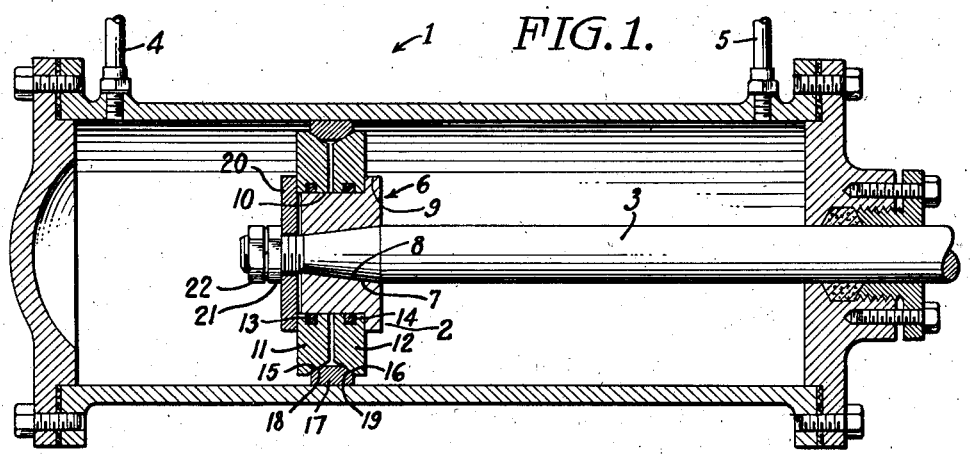
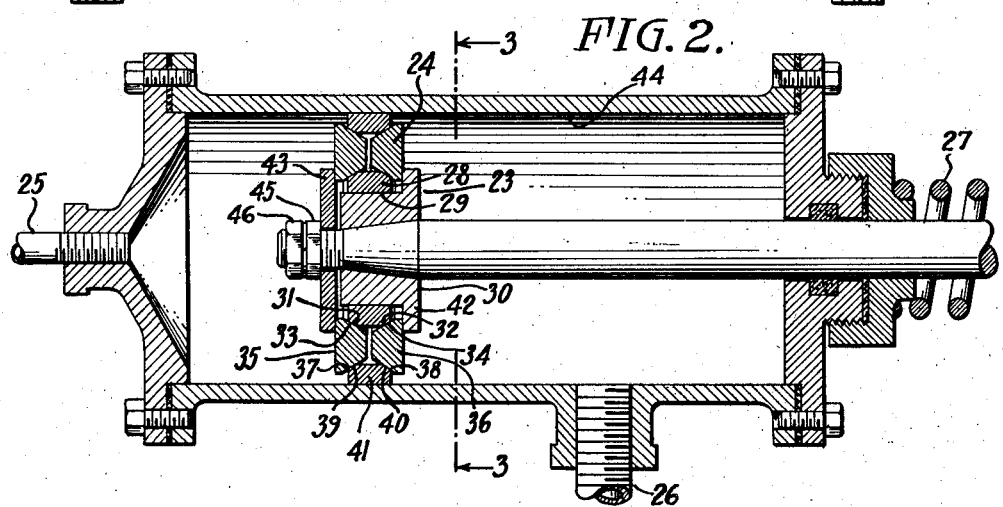
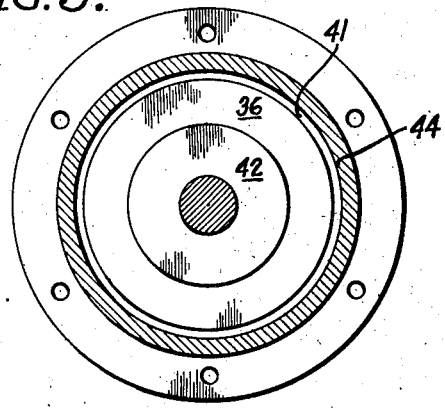
J. D. BUCHANAN,
INVENTOR.
BY
ATTORNEY Patented Jan. 29, 1946

2,393,747

UNITED STATES PATENT OFFICE 2,393,747

EXPANSIBLE PISTON

J. D. Buchanan, Burbank, Calif.

Application April 21, 1945, Serial No. 589,570

7 Claims. (Cl. 309—36)

The invention relates to an expansible piston adapted for various uses such as the piston of a work cylinder to which fluid pressure is applied on opposite sides of the piston in order to reciprocate the piston and its connected mechanism. The piston of this invention may also be employed as a relief or blow-off valve.

An object of the invention is to avoid the necessity of machining the piston to fit its cylinder with a close tolerance, while making it possible to manually adjust the working fit of the piston with the cylinder. The invention also provides means whereby the fluid pressure is operative to expand the piston and effect a sealing contact with the cylinder.

For further details of the invention, reference may be made to the drawing, wherein:

Figure 1 is a longitudinal sectional view of a work cylinder provided with one form of expansible piston according to the present invention.

Fig. 2 is a longitudinal sectional view of a relief valve having a modified form of piston according to the present invention.

Fig. 3 is a sectional view on line 3—3 of Fig. 2.

Referring in detail to the drawing, in Fig. 1 the work cylinder 1 is provided with an expansible piston 2 having a suitable piston rod 3. Fluid pressure and exhaust lines 4 and 5 are connected to the opposite ends of the cylinder 1, so that the piston 2 may be reciprocated as is well known, to thereby reciprocate whatever mechanism is connected to the piston rod 3.

The piston 2 comprises in part a hub 6 suitably secured on the piston rod 3. For example, the hub 6 may have a tapered bore 7 which fits on a correspondingly tapered portion 8 on the end of the piston rod 3. The hub 6, at one side thereof, has a flange extension 9 which serves as an abutment. Hub 6 also has a cylindrical surface 10 on which are slidably mounted two cam rings 11 and 12. The inner periphery of each cam ring 11 and 12 is provided with ring seals 13 and 14, respectively, to prevent leakage between the hub 6 and the inner periphery of these cam rings. The cam rings 11 and 12 at their outer peripheries have conical cam surfaces 15 and 16, respectively, which support an expansible piston ring 17 having corresponding cam surfaces 18 and 19 on its inner periphery.

The piston ring 17 may be an endless one-piece ring of metal such as tempered steel and it is machined to fit the bore of the cylinder 1 with a tolerance such that when ring 17 is not expanded it fits the bore of the cylinder too loosely, the tolerance being such that the ring 17 can be expanded without exceeding the elastic limit of the ring, to fit the cylinder bore.

The cam surfaces 15 and 16 on the cam rings 11 and 12 and the mating cam surfaces 18 and 19, respectively, on the piston ring 17 are preferably ground and lapped to accurately fit each other and provide a fluid seal to prevent leakage between the piston ring 17 and the cam rings 11 and 12.

The piston ring 17 may be expanded to fit the cylinder bore by reducing the separation of the cam rings 11 and 12 and for this purpose the outer end of connecting rod 3 is provided with disk 20 which may be compressed by a nut 21 having a suitable lock nut 22.

In this way, the piston ring 17 may be machined to fit the cylinder bore with a large tolerance, and the disk 20 may be advanced to compress the cam rings 11 and 12 between disk 20 and the abutment 9, until the desired close fit is obtained between the outer periphery of the piston ring 17 and the cylinder bore.

In order to provide for further and automatic expansion of the piston ring 17 by fluid pressure, viz, in the event of leakage past that ring, preferably the area of each of the outer faces of rings 11 and 12, that is, the faces exposed to fluid pressure in the cylinder, is greater than the peripheral area of piston ring 17, whereby the difference in pressure on such areas is operative to slide either cam ring 11 or cam ring 12, depending on which one is subjected to pressure, to further expand the piston ring 17 and reduce or stop the leakage.

The expansible piston of Fig. 1 may also be used in the blow-off valve 23 of Fig. 2, or in other types of cylinders, and, likewise, the expansible piston 24 in Fig. 2 may be used in the work cylinder 1 of Fig. 1 or with other types of cylinders.

In Fig. 2, the fluid pressure in the inlet 25 is relieved in a suitable outlet 26, when the pressure on the pressure side of piston 24 sufficiently overcomes the spring 27 or the like to advance the piston 24 beyond the outlet 26, as well known. The expansible piston 24 is similar to that above described, except that the seals 13 and 14, instead of being ring seals arranged in the cam rings 11 and 12, comprise a hub ring 28 like piston ring 17, except that it is compressible to fit the cylindrical surface 29 of the hub 30. Also, the outer periphery of the hub ring 28 is provided with inverted V-shaped conical fluid seal cam surfaces 31 and 32 which fit corresponding conical surfaces 33 and 34, respectively, on the inner periphery of the cam rings 35 and 36. As previously described in connection with Fig. 1, the cam rings 35 and 36 at their outer peripheries also have conical cam surfaces 37 and 38 which fit the cam surfaces 39 and 40, respectively, on the inner periphery of an expansible piston ring 41 like the piston ring 17 in Fig. 1.

When the cam rings 35 and 36 are compressed together, between the fixed abutment 42 and the movable abutment 43, the cam rings 35 and 36 both expand the piston ring 41 and compress the hub ring 28, to make the outer periphery of the piston ring 41 fit the bore of the cylinder 44, and to make the inner periphery of the hub ring 28 fit the periphery 29 of the hub 30, to prevent leakage. The movable abutment or disk 43 is held in position by suitable means, as above described, namely, by a nut 45 having a suitable lock nut 46.

It will be apparent also that the inner periphery of the hub ring 28 need be machined to fit the hub 30 only within limits determined by the amount with which the hub ring 28 may be compressed without exceeding its elastic limit.

If leakage occurs between either the outer periphery of piston ring 41 and the wall of the cylinder 44, or between the inner periphery of hub ring 28 and the hub 30, such leakage is automatically reduced or stopped, as the outer faces of the cam rings 35 and 36 each preferably have an area which is greater than both the outer periphery of piston ring 41 and the inner periphery of hub ring 28, whereby the difference in such fluid pressure is operative to further compress the cam rings 35 and 36 and, hence, further expand the piston ring 41 and further compress the hub ring 28.

It will be apparent that various modifications may be made in the invention without departing from the spirit of the following claims. For example, use may be made of more than two cam rings such as rings 11 and 12 in Fig. 1, with a piston ring like ring 17 for each two adjoining cam rings. Also, hub ring 28 may be made of various compressible materials such as rubber, rubber substitute material, or the like.

I claim:

1. A piston having a hub, spaced cam rings on said hub, an expansible piston ring having inner and outer peripheries, one of said peripheries being cylindrical, and the other periphery having oppositely inclined cam surfaces, said cam rings each having a cam surface fitting one of the cam surfaces on said piston ring, all of said cam surfaces cooperating to expand said piston ring when the distance between said cam rings is reduced, and adjustable means on said hub for adjusting the separation of said cam rings to adjustably expand said piston ring.

2. A piston comprising a hub, a cam suport surrounding and slidable on said hub, an abutment therefor, a seal between said cam support and said hub, a cam piston ring surrounding and fitting on said support, and adjustable means on said hub for operating said cam support to expand said piston ring, said cam support acting as a fluid pressure operated piston to also expand said piston ring.

3. A piston according to claim 2 wherein said cam piston ring is a one piece endless ring of tempered steel.

4. A piston according to claim 2 wherein said cam piston ring is provided at each side of its inner periphery with a conical face tapering inwardly toward the middle of the ring, said cam support comprising a pair of rings each having a conical face interfitting with one of the conical faces of said piston ring, said interfitting conical faces comprising fluid seals.

5. A piston having a hub, a pair of spaced cam rings slidable on said hub, a seal between each of said rings and hub, an expansible piston ring having an outer cylindrical periphery, and an inner periphery having oppositely inclined cam surfaces, said cam rings each having a cam surface fitting one of the cam surfaces on said piston ring, all of said cam surfaces comprising fluid seals and cooperating to expand said piston ring when the distance between said cam rings is reduced, and adjustable means on said hub for adjusting the separation of said cam rings to adjustably expand said piston ring.

6. A piston according to claim 5 wherein said first-mentioned seal comprises a ring on said hub, and cooperating fluid seal cam surfaces on said hub ring and on said cam rings.

7. A piston having a hub, a compressible ring on said hub, an expansible piston ring, and means comprising a cam ring having two cam surfaces for expanding said piston ring and compressing said hub ring.

J. D. BUCHANAN.